US012747892B2

(12) United States Patent
Delgado-Nanez

(10) Patent No.: US 12,747,892 B2
(45) Date of Patent: Sep. 29, 2026

(54) BEARING HOUSING ASSEMBLY FOR SOLAR TRACKERS

(71) Applicant: Nextpower LLC, Fremont, CA (US)

(72) Inventor: Ricardo Delgado-Nanez, San Jose, CA (US)

(73) Assignee: NEXTPOWER LLC, Fremont, CA (US)

( * ) Notice: Subject to any disclaimer, the term of this patent is extended or adjusted under 35 U.S.C. 154(b) by 749 days.

(21) Appl. No.: 18/100,849

(22) Filed: Jan. 24, 2023

(65) Prior Publication Data

US 2023/0235923 A1 Jul. 27, 2023

Related U.S. Application Data

(60) Provisional application No. 63/302,421, filed on Jan. 24, 2022.

(51) Int. Cl.

| | |
|---|---|
| ***F24S 40/80*** | (2018.01) |
| ***F24S 30/00*** | (2018.01) |
| ***F24S 30/425*** | (2018.01) |

(52) U.S. Cl.
CPC ........... *F24S 40/80* (2018.05); *F24S 2030/15* (2018.05); *F24S 30/425* (2018.05)

(58) Field of Classification Search
CPC .................................................. F24S 2030/15
See application file for complete search history.

(56) References Cited

U.S. PATENT DOCUMENTS 1,821,215 A * 9/1931 Hahn ...................... F16D 3/202 464/138
9,806,669 B2 * 10/2017 Michotte De Welle ..................... H02S 20/32
10,222,446 B2 3/2019 Au
11,035,591 B2 * 6/2021 Childress ................ F16C 17/10
2012/0180845 A1 7/2012 Cole et al.
2017/0102168 A1 * 4/2017 Childress ................ F16C 17/10
2017/0237391 A1 * 8/2017 Michotte De Welle ..................... F24S 30/425 248/372.1
2020/0076357 A1 * 3/2020 Cherukupalli .......... F24S 25/20
2021/0305932 A1 9/2021 Liu et al.

FOREIGN PATENT DOCUMENTS

| | | | | | |
|---|---|---|---|---|---|
| CN | 204578443 U | | 8/2015 | | |
| CN | 105262422 A | * | 1/2016 | | |
| CN | 105545949 A | | 5/2016 | | |
| FR | 3028113 A1 | * | 5/2016 | .............. | F24S 25/12 |
| WO | 2018167643 A1 | | 9/2018 | | |
| WO | WO-2020002327 A1 | * | 1/2020 | .............. | F24S 23/74 |

OTHER PUBLICATIONS

European Patent Office, “Extended European Search Report” , From Application No. 23743821.3, Dated Dec. 11, 2025, pp. 10.

* cited by examiner

*Primary Examiner* — Jorge A Pereiro
(74) *Attorney, Agent, or Firm* — Fredrikson & Byron, P.A.

(57) ABSTRACT

A coupling system for use with a solar tracker includes a torque tube coupling defining an arcuate slot therethrough, a mounting bracket couplable to a portion of a pier, and a first fastener, a portion of the first fastener slidably and rotatably received within a portion of the slot to enable polyaxial rotation of the torque tube coupling relative to the mounting bracket.

18 Claims, 6 Drawing Sheets

BEARING HOUSING ASSEMBLY FOR SOLAR TRACKERS

CROSS-REFERENCE TO RELATED APPLICATION

The present disclosure claims the benefit of, and priority to, U.S. Provisional Patent Application Ser. No. 63/302,421, filed on Jan. 24, 2022, the entire content of which is hereby incorporated by reference herein.

BACKGROUND

Technical Field

The present disclosure relates to solar power generation systems, and more particularly, to couplings for accommodating misalignment and thermal expansion of torque tubes of solar trackers.

Background of Related Art

To follow the trajectory of the sun, solar trackers mount solar modules on torque tube which is rotatably supported on a plurality of piers. During operation of the solar tracker, thermal fluctuations occur daily and seasonably resulting in thermal expansion and contraction of the solar tracker components. In many instances, thermal expansion is not significant enough to impart noticeable forces on the components. However, the torque tubes of the solar trackers can span significant lengths, which results in noticeable expansion and contraction during daily and seasonal temperature fluctuations.

As can be appreciated, the thermal expansion and contraction of the torque tubes can impart not so insignificant axial loads on the support structures. The torque tubes of the solar tracker are rotatably supported on the piers by a coupling. These couplings enable the torque tube to rotate about its longitudinal axis and in many embodiments, enable the torque tube to axially slide within the coupling to accommodate thermal expansion and contraction of the torque tube. As can be appreciated, axial movement of the torque tube can impart significant loads on the couplings and the piers supporting them. Axial forces due to expansion and contraction of the torque tube can cause the piers to deflect or otherwise deform to accommodate this axial movement by the torque tube. This deflection by the piers can cause misalignment of the couplings with respect to the torque tubes, which can cause increased friction or binding of the torque tube as the torque tube is rotated within the couplings. This binding or increased friction increases the amount of force required to rotate the torque tube, which in turn, imparts increased load on the actuators or motors effectuating the rotation, and in some instances can cause the torque tube to twist along its length, causing some solar panels to rotate more or less than other solar panels along the length of the torque tube.

SUMMARY

In accordance with an aspect of the present disclosure, a coupling system for use with a solar tracker includes a torque tube coupling, the torque tube coupling defining an arcuate slot therethrough, a mounting bracket, the mounting bracket couplable to a portion of a pier, and a first fastener, a portion of the first fastener slidably and rotatably received within a portion of the slot to enable polyaxial rotation of the torque tube coupling relative to the mounting bracket.

In aspects, the first fastener may enable the torque tube coupling to rotate relative to the mounting bracket about a first axis defined through a longitudinal axis of the torque tube.

In other aspects, the first fastener may enable the torque tube coupling to rotate relative to the mounting bracket about a second axis defined transverse to the first axis.

In certain aspects, the coupling system may include a spherical coupled to a portion of the first fastener and slidably and rotatably received within the slot of the torque tube coupling.

In other aspects, the arcuate slot may define a curvate profile along the length of the slot to retain the spherical therein.

In aspects, the coupling system may include a second fastener disposed in spaced relation to the first fastener, a portion of the second fastener slidably and rotatably received within a portion of the slot to enable polyaxial rotation of the torque tube coupling relative to the mounting bracket.

In other aspects, each of the first and second fasteners may include a respective first and second spherical disposed thereon, the first and second sphericals slidably and rotatably received within the slot of the torque tube coupling.

In certain aspects, the torque tube coupling may include a notch defined therethrough, the notch configured to receive a portion of a torque tube therein.

In aspects, the coupling system may include a torque tube clamp selectively couplable to a portion of the torque tube coupling, the torque tube clamp configured to abut a portion of a torque tube received within the notch to couple the torque tube to the torque tube coupling.

In other aspects, the torque tube clamp may include a protuberance disposed thereon that is configured to abut a portion of the torque tube.

In certain aspects, the torque tube clamp may include a pair of opposed flanges disposed thereon to engage a respective portion of the torque tube coupling to inhibit movement of the torque tube clamp along a transverse axis defined through the torque tube coupling.

In accordance with another aspect of the present disclosure, a coupling system for use with a solar tracker includes a torque tube coupling, the torque tube coupling defining an arcuate slot therethrough, a mounting bracket, the mounting bracket couplable to a portion of a pier, and a first fastener assembly, the first fastener assembly including a bolt selectively couplable to a portion of the mounting bracket and selectively received through a portion of the slot of the torque tube coupling, and a spherical rotatably disposed on a portion of the bolt, the spherical slidably and rotatably received within a portion of the slot to enable polyaxial rotation of the torque tube coupling relative to the mounting bracket.

In aspects, the coupling system may include a second fastener assembly disposed in spaced relation to the first fastener assembly, the second fastener assembly including a second blot selectively couplable to a portion of the mounting bracket and selectively received through a portion of the slot of the torque tube coupling, and a second spherical rotatably disposed on a portion of the blot, the second spherical slidably and rotatably received within a portion of the slot to enable polyaxial rotation of the torque tube coupling relative to the mounting bracket.

In certain aspects, the torque tube coupling may include a notch defined therein, the notch configured to receive a portion of a torque tube therein.

In other aspects, the coupling system may include a torque tube clamp selectively couplable to a portion of the torque tube coupling, the torque tube clamp configured to abut a portion of a torque tube received within the notch to couple the torque tube to the torque tube coupling.

In certain aspects, the torque tube coupling may be formed by stamping.

In accordance with another aspect of the present disclosure, a coupling system for use with a solar tracker includes a pier extending between opposed first and second end portions, a mounting bracket coupled to the second end portion of the pier, a torque tube coupling operably coupled to the mounting bracket, the mounting bracket permitting polyaxial rotation of the torque tube coupling relative to the mounting bracket as the second end portion of the pier is caused to be deflected relative to the first end portion.

In aspects, the coupling system may include a torque tube selectively coupled to a portion of the torque tube coupling, wherein axial expansion and contraction of the torque tube effectuates a corresponding deflection of the first end portion of the pier.

In certain aspects, the torque tube coupling may include an arcuate slot defined therein configured to slidably and rotatably receive a portion of a spherical therein, the spherical operably coupled to a portion of the mounting bracket.

In other aspects, the torque tube coupling may include a notch defined therein, the notch configured to selectively receive a portion of the torque tube therein.

BRIEF DESCRIPTION OF THE DRAWINGS

Various aspects and features of the present disclosure are described hereinbelow with reference to the drawings, wherein.

DETAILED DESCRIPTION

Figure 1:
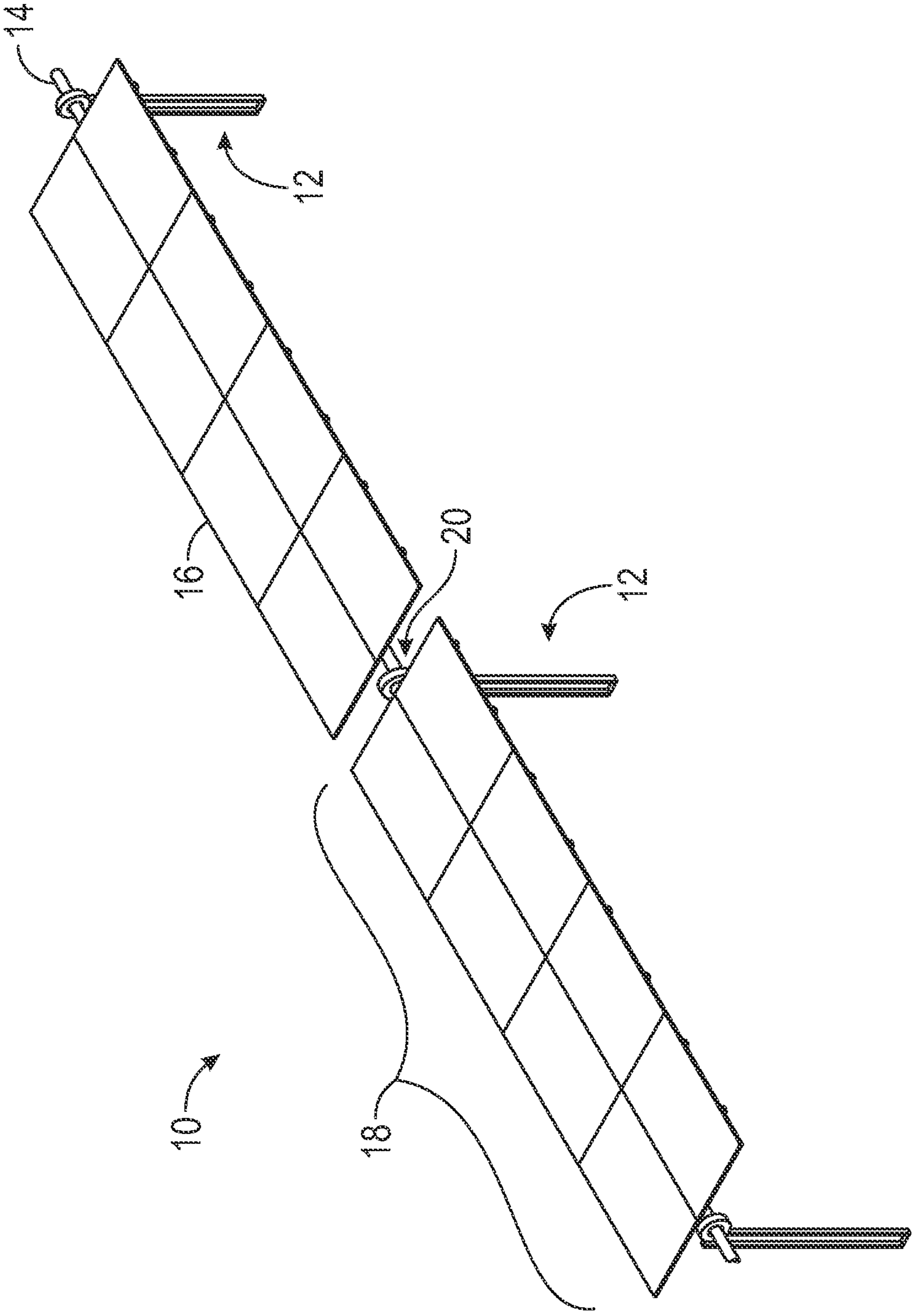
FIG. 1 is a perspective view of a solar tracking system provided in accordance with the present disclosure.
Figure 2:
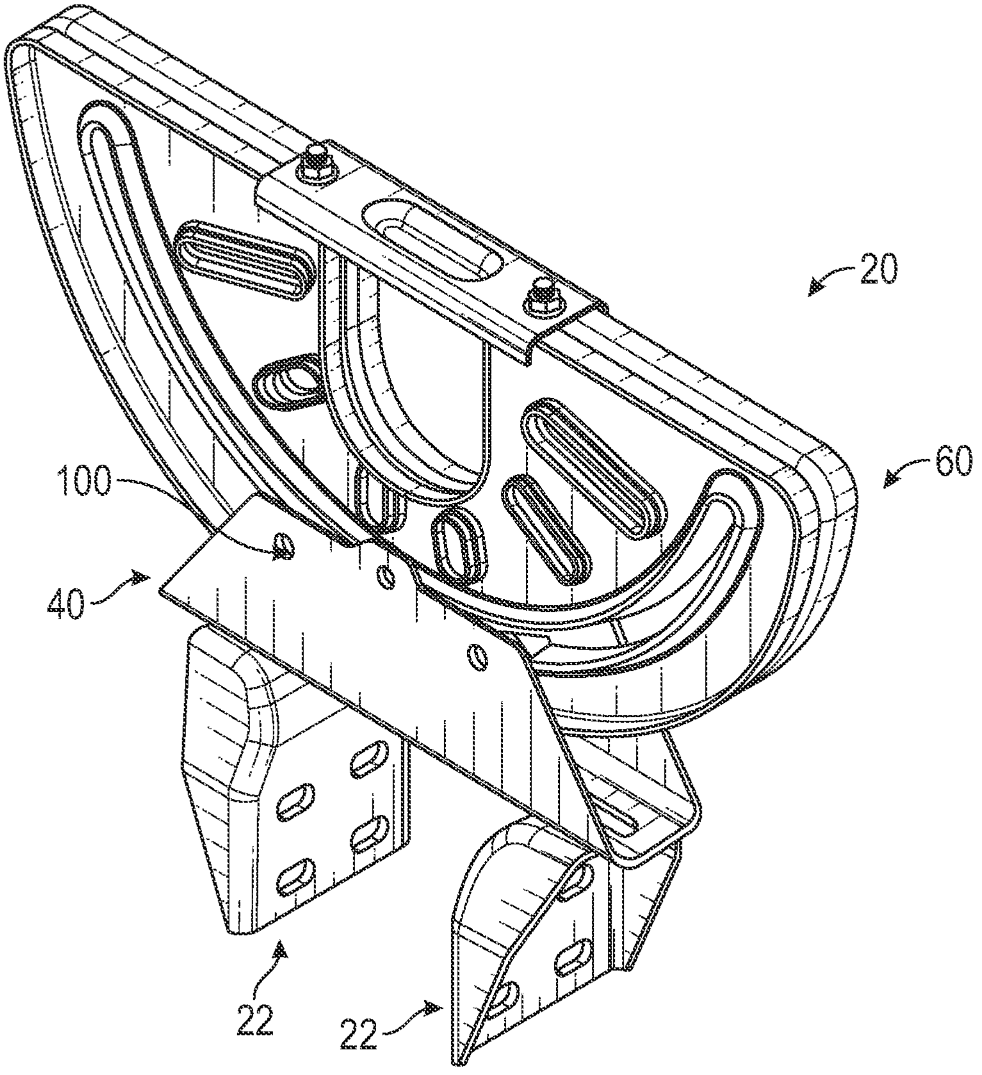
FIG. 2 is a perspective view of a coupling assembly of FIG. 1.

The present disclosure is directed to a coupling system for use with a solar tracker. The coupling system, or bearing housing assembly, includes a pair of pier couplings, a mounting bracket, a torque tube coupling assembly, and a pair of fastener assemblies. The pair of pier couplings is configured to selectively couple the mounting bracket to a pier of the solar tracker. The mounting bracket is selectively coupled to the pair of pier couplings and is configured to operably support the torque tube coupling assembly thereon. In this manner, the mounting bracket includes a pair of through-holes defined therethrough that is configured to receive a respective fastener assembly of the pair of fastener assemblies therethrough.

The torque tube coupling assembly includes a pair of half-sections and a torque tube clamp selectively coupled thereto. The pair of half-sections define a generally half-circle or taco profile and include an arcuate slot defined therethrough adjacent a lower arcuate outer surface. The arcuate slot of each half-section of the pair of half sections includes an upturned flange extending along a perimeter thereof to which a pair of plates are clinched or otherwise coupled to, which forms a raceway in which a spherical or ball is cradled, cupped, or otherwise retained. The pair of plates define an arcuate profile when viewed from a side of the pair of half-sections to accommodate the spherical profile of the spherical. As can be appreciated, the clinching of the pair of plates to the upturned flanges of the slots of the pair of half-sections inhibits the pair of half-sections from splitting apart or otherwise being separated. Each of the pair of half-sections includes a notch defined therein and through an upper surface thereof that is configured to selectively receive a portion of a torque tube therein. As such, rotation of the torque tube effectuates a corresponding rotation of the pair of half-sections.

The torque tube clamp defines a generally U-shaped profile and includes a protuberance disposed on a backspan thereof that is configured to abut or otherwise contact a torque tube. In this manner, the torque tube clamp is selectively coupled to the pair of half-sections to clamp or otherwise couple a torque tube to the pair of half-sections when the torque tube is disposed within the notch of the pair of half-sections. As can be appreciated, with the torque tube coupled to the pair of half-sections, rotation of the torque tube effectuates a corresponding rotation of the torque tube coupling assembly and axial movement of the torque tube effectuates a corresponding axial movement of the torque tube coupling assembly.

The pair of fastener assemblies includes a bolt, a pair of sleeves, a spherical, and a nut. The spherical is a spherical bearing, ball bearing, or the like and is configured to be received within the slot or raceway of the torque tube coupling assembly such that the torque tube coupling assembly is permitted to rotate about a first axis defined through a longitudinal axis of the torque tube and rotate about a second axis defined transverse to the first axis and through a center of the spherical bearings of each of the pair of fastener assemblies. The sphericals of each of the pair of fastener assemblies are disposed in spaced relation to one another and are rotatably supported on the bolt. In this manner, the bolt is selectively received within a corresponding bore defined through the mounting bracket and extends through the slot of the torque tube coupling assembly. Each of the pair of sleeves is disposed on opposing sides of the spherical and are supported on the bolt. In this manner, the pair of sleeves is interposed between the spherical and the mounting bracket on each side of the spherical. The nut is threadably engaged with the bolt and secures the fastener assembly to the mounting bracket.

In operation, with the torque tube coupled to the coupling assembly, as the torque tube expands and contracts due to daily or seasonal temperature fluctuations, the torque tube coupling assembly is caused to likewise translate relative to the pier on which the coupling assembly is supported. The axial motion torque tube and torque tube coupling assembly exerts an axial force on the spherical of the fastener assembly, which in turn exerts a force on the mounting bracket, pair of pier couplings, and the pier. Continued axial motion of the torque tube causes the pier to deflect or otherwise bend relative to the ground, causing the mounting bracket to form an angle relative to the torque tube. To avoid misalignment and binding of the torque tube within the torque tube coupling assembly, the spherical enables the torque tube coupling assembly to rotate relative to the pier and mounting bracket to maintain a generally perpendicular angle relative to the torque tube. Therefore, the torque tube is permitted to freely rotate relative to the pier on the sphericals of the pair of fastener assemblies. These and other aspects of the present disclosure will be described in detail herein below with reference to the drawings.

Referring now to the drawings, a solar tracker provided in accordance with the present disclosure is illustrated in FIG. 1 and generally identified by reference numeral 10. The solar tracker 10 includes a plurality of piers 12 disposed in spaced relation to one another and embedded in the earth. A torque tube 14 extends between each adjacent pier 12 and is rotatably supported on each pier 12. The torque tube 14 is rotatably supported on each pier 12 by a coupling assembly or bearing housing assembly (BHA) 20, a slew drive (not shown), amongst others. In one non-limiting embodiment, the torque tube is rotatably supported on each pier 12 by a respective BHA 20, as will be described in further detail hereinbelow.

The solar tracker 10 includes a plurality of solar panels 16 supported on each respective torque tube 14. The span between two adjacent piers 12 is referred to as a bay 18 and may be generally in the range of about 8 meters in length. A plurality of solar trackers 10 may be arranged in a north-south longitudinal orientation to form a solar array.

Figure 3:
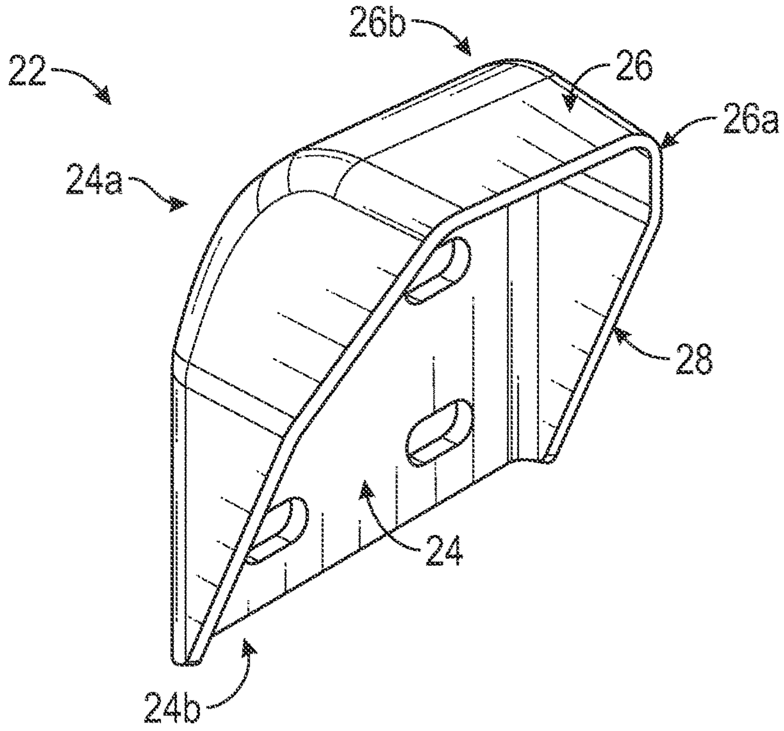
FIG. 3 is a perspective view of a pier coupling of the coupling assembly of FIG. 2.
Figure 4:
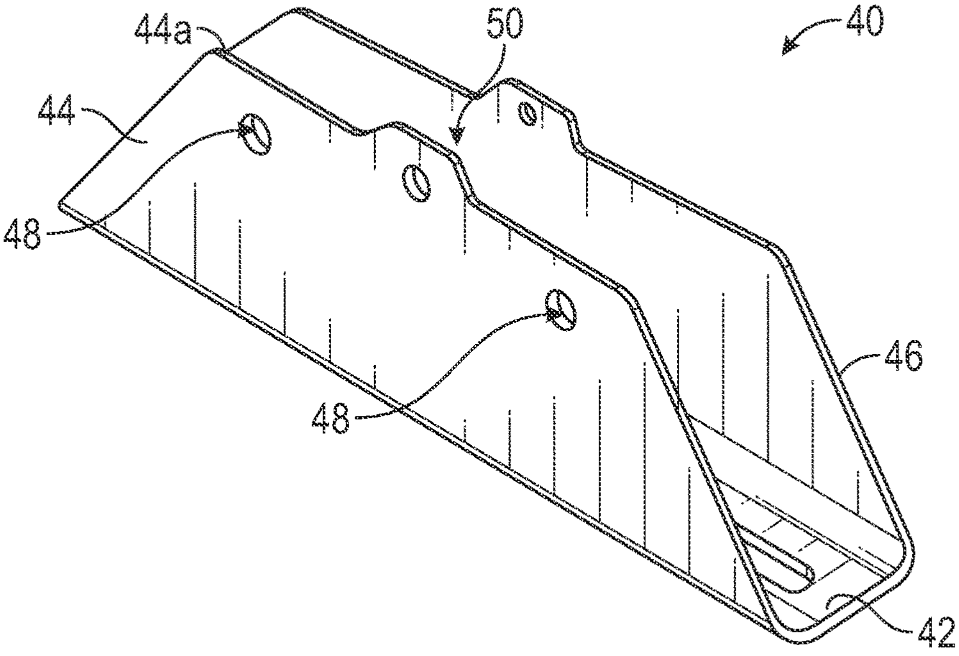
FIG. 4 is a perspective view of a mounting bracket of the coupling assembly of FIG. 2.

With reference to FIG. 2-8, the coupling assembly or BHA 20 includes a pair of pier couplings 22, a mounting bracket 40, a torque tube coupling assembly 60, and a pair of fastener assemblies 100. Each of the pair of pier couplings 22 is substantially similar to one another, and therefore, only one pier coupling 22 will be described in detail herein in the interest of brevity. The pier coupling 22 defines a generally lowercase ‘r” profile, having a first leg 24 extending between opposed upper and lower portions 24*a* and 24*b*, respectively, and a second, generally transverse leg 26 extending between opposed first and second end portions 26*a* and 26*b*, respectively (FIG. 3). The second leg 26 is coupled to the upper portion 24*a* of the first leg adjacent the second end portion 26*a* and extends therefrom. Although generally described as being disposed transverse to the first leg 24, it is contemplated that the second leg 26 may define any suitable angle relative to the first leg 24.

The first leg 24 is coupled to a respective pier 12 using any suitable means, such as fasteners, welding, adhesives, amongst others and the second leg 26 is coupled to a portion of the mounting bracket 40 using any suitable means, such as fasteners, welding, adhesives, amongst others, and may be coupled to the mounting bracket 40 using the same or different means employed for coupling the pier coupling 22 to the pier 12. As can be appreciated, the pier coupling 22 fastens or otherwise couples the mounting bracket 40 to a pier 12 such that forces transmitted to the pier coupling 22 are transferred to the pier 12.

In embodiments, the pier coupling 22 may include one or more gussets 28 extending between the first leg 24 and the second leg 26 to stiffen or otherwise strengthen the pier coupling 22. It is envisioned that the pier coupling 22 may be formed as a unitary component by stamping, hydroforming, machining, additive manufacturing, amongst others, or in embodiments, may be formed from one or more components joined together via welding, fasteners, adhesives, clinching, amongst others.

With reference to FIG. 3, the mounting bracket 40 defines a generally U-shaped configuration having a backspan 42 extending between opposed vertical flanges 44 and 46, respectively. As described hereinabove, it is envisioned that the backspan 42 of the mounting bracket 40 may be coupled to each of the pier couplings 22 using any suitable means, such as fasteners, welding, adhesives, amongst others. The opposed vertical flanges 44, 46 are substantially similar to one another and therefore, only one vertical flange 26 will be described in detail herein in the interest of brevity. The vertical flange 44 extends from the backspan 42 and terminates at an end portion 44*a*. Although generally illustrated as defining a trapezoidal profile, it is envisioned that the vertical flange 44 may define any suitable profile, such as rectangular, square, oval, racetrack, amongst others. The vertical flange 44 includes a pair of through-holes 48 defined therethrough adjacent the end portion 44*a* and disposed in spaced relation to one another. The pair of through-holes 48 is configured to receive a respective fastener therethrough, as will be described in further detail hereinbelow. In embodiments, the vertical flange 44 may include a tab 50 disposed on the end portion 44*a* at a center portion thereof. The vertical flange 44 may include an aperture defined therethrough that is configured to receive a fastener (not shown) or the like. It is envisioned that the mounting bracket 40 may be formed as a unitary component by stamping, hydroforming, machining, additive manufacturing, amongst others, or in embodiments, may be formed from one or more components joined together via welding, fasteners, adhesives, clinching, amongst others.

Figure 5:
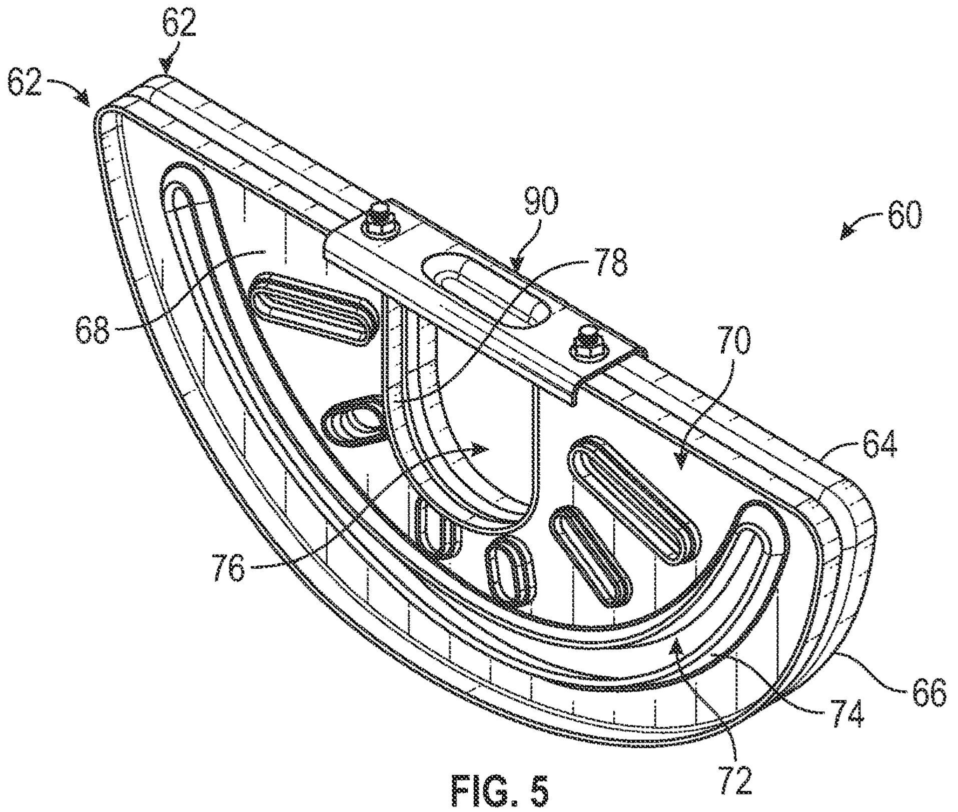
FIG. 5 is a perspective view of a torque tube coupling assembly of the coupling assembly of FIG. 2.
Figure 6:
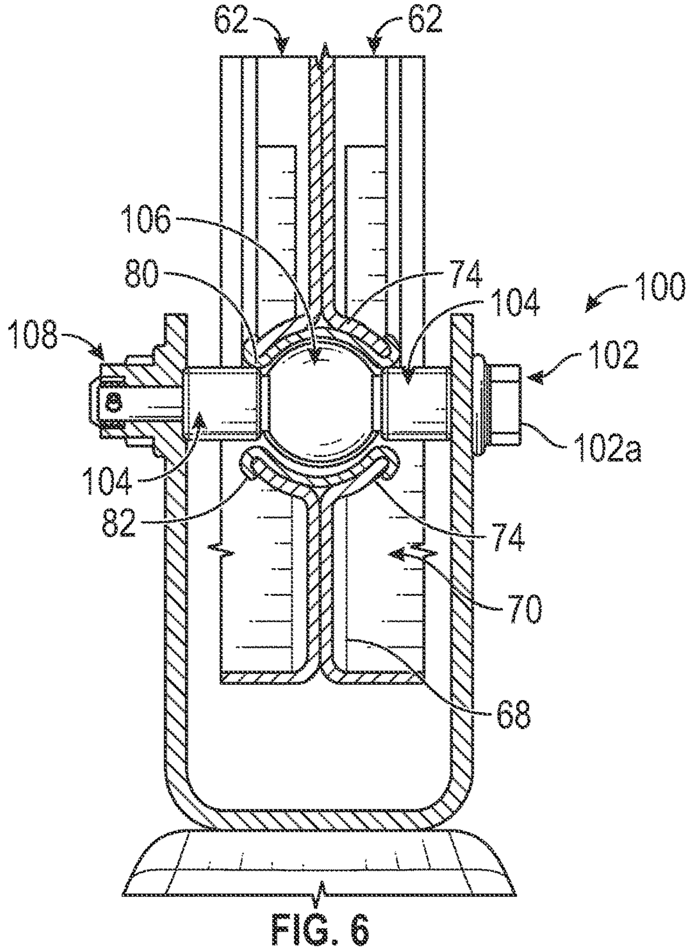
FIG. 6 is a side, cross-sectional view of the torque tube coupling assembly of FIG. 5.

With reference to FIGS. 5 and 6, the torque tube coupling assembly 60 includes a pair of half-sections 62 coupled to and disposed in juxtaposed relationship to one another and a torque tube clamp 90 configured to clamp or otherwise couple a torque tube 14 to the pair of half-sections 62 as will be described in further detail hereinbelow.

Each of the pair of half sections 62 is substantially similar to one another and therefore, only one half-section 62 will be described in detail herein in the interest of brevity. The half section 62 defines a generally half-circle or taco shaped configuration defining a generally planar upper surface 64 and a generally arcuate lower surface 66 extending between opposed end portions of the upper surface 64. The half section 62 includes a generally planar center surface 68 interposed between the upper surface 64 and the arcuate lower surface 66 defining a cavity 70 therebetween.

The center surface 68 includes a slot 72 defined therein having a generally arcuate profile and generally following the arcuate profile of the arcuate lower surface 66, although it is contemplated that the slot 72 may include any suitable profile and length, depending upon the design needs of the torque tube coupling assembly 60. The slot 72 defines an upturned flange 74 extending around the perimeter of the slot 72 and extending away from the center surface 68. The upturned flange 74 defines a generally arcuate profile arcing towards an interior portion of the slot 72, although it is contemplated that the upturned flange 74 may define any suitable profile, such as linear, sinusoidal, amongst others. With reference to FIG. 6, when the pair of half sections 62 is coupled to one another, the slot 72 is generally aligned in each of the pair of half sections 62 and the upturned flange 74 of each of the pair of half-sections 62 extends in opposing directions defining a raceway therebetween for receipt of a spherical, ball bearing, or the like, as will be described in further detail hereinbelow.

The center surface 68 of the half section 62 defines a notch 76 therethrough which extends through the upper surface 64. The notch 76 is configured to receive a portion of a torque tube 14 therein. In this manner, the notch 76 may define a profile that complementary to an outer profile of the torque tube 14 (e.g., D-shaped, circular, oval, amongst others) or in embodiments may be different that the outer profile of the torque tube 14. In one non-limiting embodiment, the notch 76 defines a generally U-shaped profile to receive a portion of the torque tube 14 therein. In embodiments, the notch 76 may include an upturned flange 78 extending into the cavity 70. It is envisioned that the upturned flange 78 may extend any suitable distance and may be the same or similar distance to that of the upper surface 64 and the arcuate lower surface 66. As can be appreciated, the upturned flange 78 provides an increased bearing area on which the torque tube 14 can abut. It is envisioned that the pair of half sections 62 may be formed from any suitable material, such as a metallic material, a non-metallic material, a composite, amongst others, and may be formed from one or more pieces of material using any suitable method such as stamping, hydroforming, additive manufacturing, welding, machining, adhesives, amongst others. In embodiments, each of the pair of half sections 62 may be formed form the same or different material from one another, depending upon the design needs of the torque tube coupling assembly 60.

It is contemplated that each of the pair of half sections 62 is coupled to one another using any suitable means, such as welding, adhesives, fasteners, clinching, amongst others. In one non-limiting embodiment, the pair of half-sections 62 includes a pair of plates 80, 82 disposed on opposed portions of the slot 72 (e.g., upper and lower portions). Each of the pair of plates 80, 82 defines a generally arcuate (e.g., concave) profile when viewed from a side portion of the pair of half-sections 62 and generally follow the arcuate profile of the slot 72 along its length. In this manner, the pair of plates 80, 82 cooperate to define a circular or oval slot in which a ball bearing or the like can be disposed (e.g., cradled, clinched, etc.) to accommodate polyaxial movement of the torque tube coupling 60 relative to the pier 12 as the torque tube 14 expands and contracts in an axial direction. Each of the pair of plates 80, 82 is clamped or otherwise clinched onto a portion of each respective upturned flange 78 to aid in securing the pair of half-sections 62 to one another and maintain the pair of plates 80, 82 in the proper location during use. It is contemplated that the pair of plates 80, 82 may be formed from the same or different material than the pair of half-sections 62. In one non-limiting embodiment, the pair of plates 80, 82 is formed from a material that is harder than the pair of half-sections 62 to inhibit the spherical from deforming or otherwise wearing the pair of plates 80, 82 as the spherical rides or translates within the slot 72.

Figure 7:
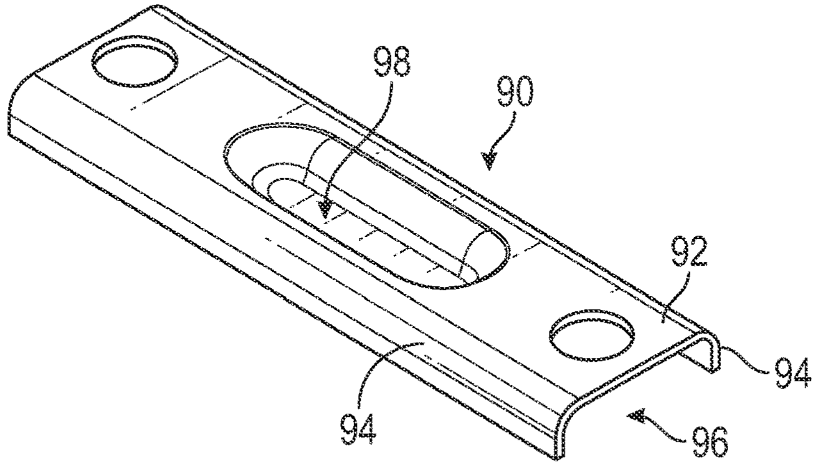
FIG. 7 is a perspective view of a torque tube clamp of the torque tube coupling assembly of FIG. 5.

With reference to FIG. 7, the torque tube clamp 90 defines a generally U-shaped configuration having a backspan 92 extending between a pair of opposed flanges 94 disposed in a transverse orientation to the backspan 92 and defining a cavity 96 therebetween. The pair of opposed vertical flanges 94 is disposed in spaced relation to one another such that each of the pair of opposed vertical flanges 94 abuts or otherwise overhangs an outer portion of the upper surface 64 of each of the pair of half-sections 62 to aid in locating the torque tube clamp 90 relative to the pair of half-sections 62 and aid in clamping or otherwise coupling the pair of half-sections 62 to one another. The backspan 92 includes a protuberance 98 formed thereon that extends into the cavity 96 formed between the pair of opposed flanges 94. In embodiments, the protuberance 98 extends past the pair of opposed vertical flanges 94 such that the protuberance 98 abuts or otherwise clamps or squeezes a torque tube when the torque tube is received within the notch 76. In this manner, the torque tube clamp 90 is selectively coupled to a portion of one or both of the pair of half-sections 62 using any suitable means, such as fasteners, clamps, adhesives, welding, amongst others. In one non-limiting embodiment, the torque tube clamp 90 is selectively coupled to the pair of half-sections 62 using a pair of fasteners. It is envisioned that the torque tube clamp 90 may be formed from any suitable material, such as a metallic material, a non-metallic material, a composite, or the like, and may formed from the same or different material than the various components described herein. In embodiments, the torque tube clamp 90 is formed from one or more pieces of material using any suitable method, such as stamping, hydroforming, machining, additive manufacturing, welding, adhesives, amongst others.

Figure 8:
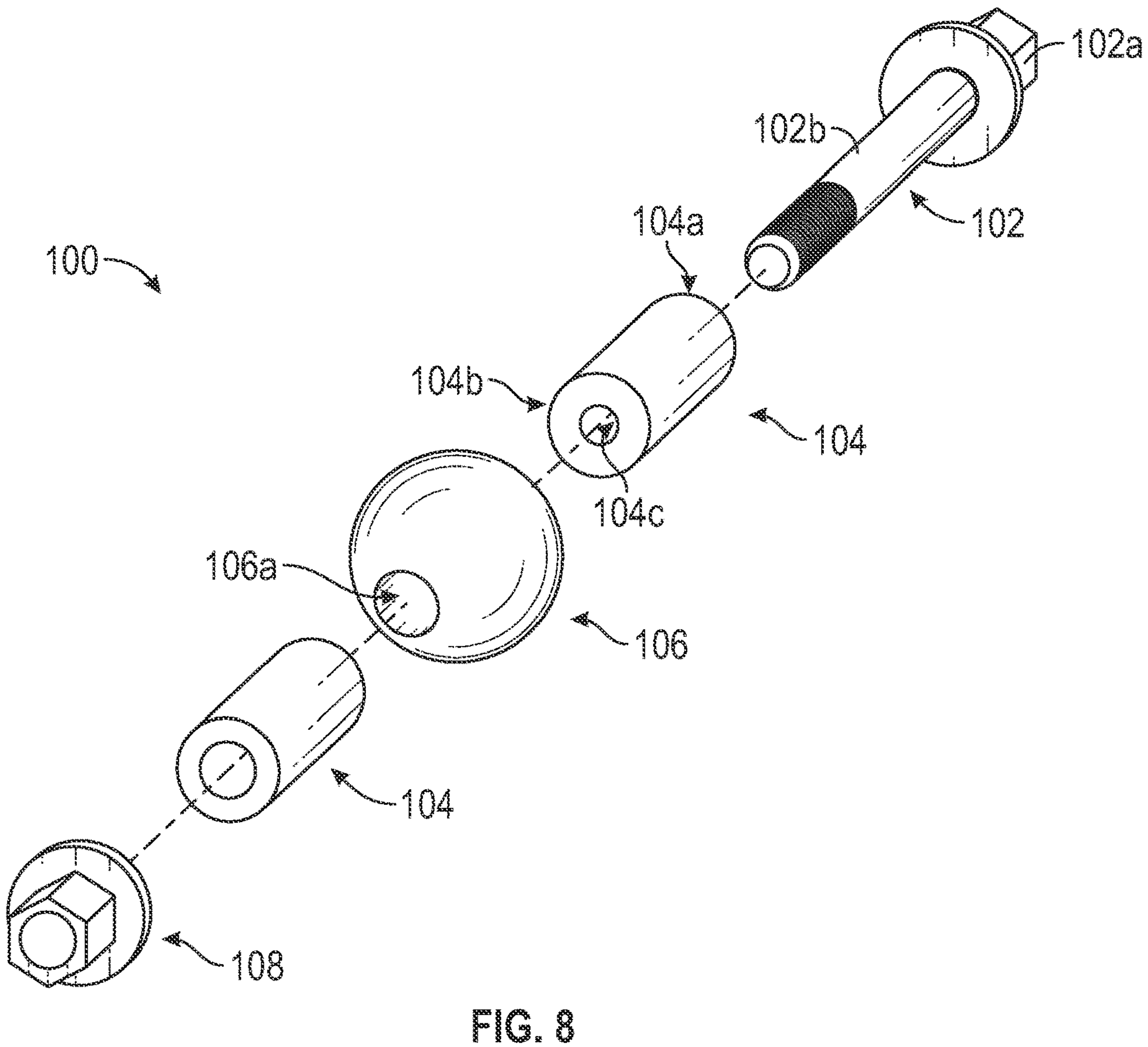
FIG. 8 is an exploded view of a fastener assembly of the torque tube coupling assembly of FIG. 5.

With additional reference to FIGS. 6 and 8, the pair of fastener assemblies 100 are substantially similar and therefore, only one fastener assembly 100 will be described in detail herein in the interest of brevity. The fastener assembly 100 includes a bolt 102, a pair of sleeves 104, a ball or spherical 106, and a nut 108. The bolt 102 includes a head **102*a* and a shank 102*b* disposed thereon and extending therefrom. The shank 102*b* is at least partially threaded to threadably engage a threaded portion of the nut 108 and includes an outer dimension that is configured to be received within the pair of through-holes 48 of the mounting bracket 40. Although generally illustrated as being a hex bolt, it is contemplated that the bolt 102** may be any suitable fastener, such as a cap screw, threaded rod, unthreaded rod, amongst others.

Each of the pair of sleeves 104 is substantially similar to one another and therefore, only one sleeve 104 will be described in detail herein in the interest of brevity. The sleeve 104 extends between opposed first and second end portions **104*a* and 104*b* respectively and defines a generally circular cross-section, although it is contemplated that the sleeve 104 may define any suitable cross-section, such as square, rectangular, oval, hexagonal, amongst others. The sleeve 104 includes a through-bore 104*c* defined through the first and second end portions 104*a*, 104*b* that includes an inner dimension that is configured to receive a portion of the shank 102*b*** of the bolt, as will be described in further detail hereinbelow.

Each of the pair of sleeves 104 is configured to be interposed between an inner portion of the opposed vertical flanges 44, 46 of the mounting bracket 40 and the spherical 106, such that a sleeve of the pair of sleeves 104 is disposed on either side of the spherical 106 to center or otherwise maintain the torque tube coupling assembly 60 at a central location between the opposed vertical flanges 44, 46. In embodiments, each of the pair of sleeves 104 includes a length that leaves a gap or space between the pair of sleeves 104 and the spherical 106 and/or the opposed vertical flanges 44, 46 of the mounting bracket 40 to enable the torque tube coupling assembly 60 to freely move relative to the mounting bracket 40. Although generally described has leaving a gap between the between the pair of sleeves 104 and the spherical 106 and/or the opposed vertical flanges 44, 46, it is envisioned that the pair of sleeves 104 may include any suitable length and may the same length of may have different lengths depending upon the design needs of the BHA 20.

The spherical 106 defines a generally spherical profile having a centerbore 106*a* defined therethrough that is configured to receive a portion of the shank 102*b* of the bolt 102 therethrough. The spherical 106 includes an outer dimension that is configured to be slidably received within the slot 72 of the torque tube coupling assembly 60 such that the spherical 106 abuts or otherwise rides against one or both of the pair of plates 80, 82. As can be appreciated, the arcuate profile of the pair of plates 80, 82 cradles or otherwise cups the ball or spherical 106 to inhibit movement in a transverse or axial direction relative to the bolt 102 while permitting the torque tube coupling assembly 60 to pivot or otherwise rotate about the spherical 106. It is contemplated that the spherical 106 may be a spherical bearing, a ball bearing, amongst others, and may include a hardness suitable to resist deforming or the like from a load imparted thereon.

The nut 108 threadably engages the threaded portion of the shank 102*b* of the bolt 102 to capture or otherwise secure the bolt 102, the pair of sleeves 104, the spherical 106, and the torque tube coupling assembly 60 to the mounting bracket 40. It is envisioned that the nut 108 may be any suitable fastener, such as a flange nut, lock nut, amongst others.

Figure 9:
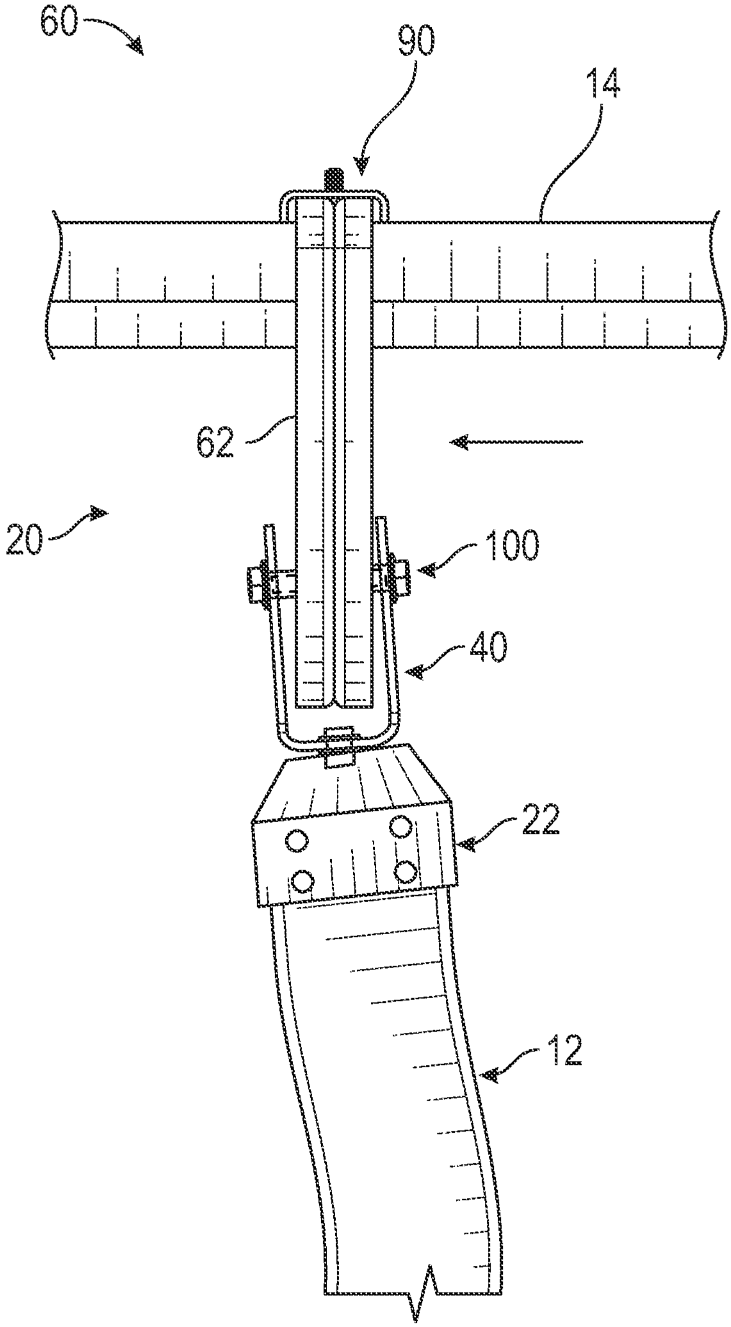
FIG. 9 is an elevation view of the coupling assembly of FIG. 2 shown with an axial load placed on the coupling assembly.

With reference to FIG. 9, in operation, the torque tube 14 is disposed within the notch 76 of the torque tube coupling assembly 60 and the torque tube clamp 90 is secured or otherwise coupled to the pair of half-sections 62 to clamp or otherwise inhibit movement of the torque tube 14 relative to the torque tube coupling assembly 60. As the torque tube 14 expands or contracts due to daily temperature fluctuations or seasonal changes, the torque tube 14 applies an axial force on the torque tube coupling assembly 60 in a pushing or pulling manner. The axial force placed upon the torque tube coupling assembly 60 is transferred to the spherical 106, which in turn, transfers the force to one or both of the pair of sleeves 104, which in turn, transfers the force to the mounting bracket 40. The force applied to the mounting bracket 40 is transferred to the pair of pier couplings 22, and therefore, the pier 12. As can be appreciated, the axial force applied to the pier 12 causes the pier 12 to deflect or otherwise bend relative to the ground, due to the pier 12 being embedded in the earth, which forms an angle relative to the torque tube 14. This deflection by the pier 12 causes the BHA 20 to likewise form an angle relative to the torque tube 14, which can cause binding or otherwise inhibit rotation of the torque tube relative to the pier 12.

The circular profile of the spherical 106 enables the torque tube coupling assembly 60 to maintain a generally 90-degree angle relative to the torque tube 14 as the torque tube coupling assembly 60 is caused to translate axially relative to the pier 12, while enabling the pier 12 and the mounting bracket 40 to deflect and form an angle relative to the torque tube coupling assembly 60. It is envisioned that the spherical 106 enable the pier 12 and, therefore, the mounting bracket 40 to rotate up to about 5 degrees relative to the torque tube coupling assembly 60 without causing the torque tube 14 to bind or be inhibited from rotating relative to the pier 12. As can be appreciated, the arcuate slot 72 of the pair of half-sections 62 forms a raceway through which the spherical 106 can ride as the torque tube coupling assembly 60 is caused to be rotated by the torque tube 14 relative to the pier 12. In embodiments, the slot 72 includes a length that enables the torque tube coupling assembly 62 to rotate through a range of about 55 degrees.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling system for use with a solar tracker, comprising:

a torque tube coupling, the torque tube coupling defining an arcuate slot therethrough;

a mounting bracket, the mounting bracket couplable to a portion of a pier; and a first fastener comprising a spherical, a first sleeve extending between a first side of the spherical and a first side of the mounting bracket to define a first gap between the first side of the mounting bracket and the torque tube coupling, and a second sleeve extending between a second side of the spherical and a second side of the mounting bracket to define a second gap between the second side of the mounting bracket and the torque tube coupling, at least a portion of the first fastener slidably and rotatably disposed at the slot to enable polyaxial rotation of the torque tube coupling, including about the first gap and the second gap, relative to the mounting bracket.

2. The coupling system according to claim 1, wherein the first fastener enables the torque tube coupling to rotate relative to the mounting bracket about a first axis defined along a longitudinal axis of a torque tube to which the torque tube coupling is couplable.

3. The coupling system according to claim 2, wherein the first fastener enables the torque tube coupling to rotate relative to the mounting bracket about a second axis defined transverse to the first axis.

4. The coupling system according to claim 1, further comprising a spherical coupled to a portion of the first fastener and slidably and rotatably received within the slot of the torque tube coupling.

5. The coupling system according to claim 4, further comprising a second fastener disposed in spaced relation to the first fastener, a portion of the second fastener slidably and rotatably received within a portion of the slot to enable polyaxial rotation of the torque tube coupling relative to the mounting bracket.

6. The coupling system according to claim 5, wherein each of the first and second fasteners include a respective first and second spherical disposed thereon, the first and second sphericals slidably and rotatably received within the slot of the torque tube coupling.

7. The coupling system of claim 1, wherein the arcuate slot defines a curved profile along the length of the slot to retain the spherical therewithin, and wherein the first sleeve and the second sleeve extend out from the arcuate slot.

8. The coupling system according to claim 1, wherein the torque tube coupling includes a notch defined therethrough, the notch configured to receive a portion of a torque tube therein.

9. The coupling system according to claim 8, further comprising a torque tube clamp selectively couplable to a portion of the torque tube coupling, the torque tube clamp configured to abut a portion of a torque tube received within the notch to couple the torque tube to the torque tube coupling.

10. A coupling system for use with a solar tracker, comprising:

a torque tube coupling, the torque tube coupling defining an arcuate slot therethrough;

a mounting bracket, the mounting bracket couplable to a portion of a pier;

a first fastener, a portion of the first fastener slidably and rotatably disposed at the slot to enable polyaxial rotation of the torque tube coupling relative to the mounting bracket; and a torque tube clamp selectively couplable to a portion of the torque tube coupling, the torque tube clamp configured to abut a portion of a torque tube received within the notch to couple the torque tube to the torque tube coupling, wherein the torque tube coupling includes a notch defined therethrough, the notch configured to receive a portion of a torque tube therein, and wherein the torque tube clamp includes a protuberance disposed thereon that is configured to abut a portion of the torque tube.

11. The coupling system according to claim 9, wherein the torque tube clamp includes a pair of opposed flanges disposed thereon to engage a respective portion of the torque tube coupling to inhibit movement of the torque tube clamp along a transverse axis defined through the torque tube coupling.

12. A coupling system for use with a solar tracker, comprising:

a torque tube coupling, the torque tube coupling defining an arcuate slot therethrough;

a mounting bracket, the mounting bracket couplable to a portion of a pier; and a first fastener assembly, the first fastener assembly including:

a bolt selectively couplable to a portion of the mounting bracket and selectively received through a portion of the slot of the torque tube coupling;

a spherical rotatably disposed on a portion of the bolt;

a first sleeve extending between a first side of the spherical and a first side of the mounting bracket to define a first gap between the first side of the mounting bracket and the torque tube coupling; and a second sleeve extending between a second side of the spherical and a second side of the mounting bracket to define a second gap between the second side of the mounting bracket and the torque tube coupling, wherein the spherical is slidably and rotatably disposed at the slot to enable polyaxial rotation of the torque tube coupling, including about the first gap and the second gap, relative to the mounting bracket.

13. The coupling system according to claim 12, further comprising:

a second fastener assembly disposed in spaced relation to the first fastener assembly, the second fastener assembly including:

a second bolt selectively couplable to a portion of the mounting bracket and selectively received through a portion of the slot of the torque tube coupling; and a second spherical rotatably disposed on a portion of the bolt, the second spherical slidably and rotatably received within a portion of the slot to enable polyaxial rotation of the torque tube coupling relative to the mounting bracket.

14. The coupling system according to claim 12, wherein the torque tube coupling includes a notch defined therein, the notch configured to receive a portion of a torque tube therein.

15. The coupling system according to claim 14, further comprising a torque tube clamp selectively couplable to a portion of the torque tube coupling, the torque tube clamp configured to abut a portion of a torque tube received within the notch to couple the torque tube to the torque tube coupling.

16. The coupling system according to claim 12, wherein the torque tube coupling is formed by stamping.

17. A coupling system for use with a solar tracker, comprising:

a pier extending between opposed first and second end portions;

a mounting bracket coupled to the second end portion of the pier;

a torque tube coupling operably coupled to the mounting bracket, the mounting bracket permitting polyaxial rotation of the torque tube coupling relative to the mounting bracket as the first end portion of the pier is caused to be deflected relative to the second end portion, wherein the torque tube coupling includes an arcuate slot defined therein, the torque tube coupling configured to enable at least a portion of a spherical to be both slidably and rotatably disposed at the slot when the spherical is operably coupled to a first side of the mounting bracket via a first sleeve that extends along a first gap between the spherical and the first side of the mounting bracket and to a second side of the mounting bracket via a second sleeve that extends along a second gap between the spherical and the second side of the mounting bracket; and a torque tube selectively coupled to a portion of the torque tube coupling, wherein axial expansion and contraction of the torque tube effectuates a corresponding deflection of the first end portion of the pier.

18. The coupling system according to claim 17, wherein the torque tube coupling includes a notch defined therein, the notch configured to selectively receive a portion of the torque tube therein.

* * * * *